Patented Mar. 21, 1933

1,902,405

UNITED STATES PATENT OFFICE

JOSEPH R. INGRAM, OF NITRO, WEST VIRGINIA, ASSIGNOR TO THE RUBBER SERVICE LABORATORIES CO., OF AKRON, OHIO, A CORPORATION OF OHIO

AGE RESISTING VULCANIZED RUBBER PRODUCT AND PROCESS OF MANUFACTURING SAME

No Drawing.    Application filed June 14, 1930. Serial No. 461,264.

The present invention relates to a process for the manufacture of vulcanized rubber and the products obtained thereby. More particularly the invention is directed to an improved process of manufacturing vulcanized rubber and the like wherein there is incorporated into a rubber mix of vulcanization characteristics a compound of the type hereinafter disclosed whereby anti-oxidant or age resisting properties are developed in the vulcanized rubber product. The invention will be understood from the following description and examples wherein a preferred mode of operating the invention is fully set forth and described.

It is well known that rubber deteriorates rapidly when exposed to air, heat and sunlight and that such deterioration is characterized by a loss in the tensile strength, resiliency and other desirable properties of the material. It has now been found according to the present invention that such deterioration can be very greatly lessened if there be incorporated in the rubber mix a compound of the class hereinafter set forth.

The age resisting characteristics of a vulcanized rubber product can be readily ascertained by subjecting samples of the vulcanized product to an accelerated aging test wherein portions of the cured rubber product are subjected in a bomb to the action of oxygen under pressure and maintained for several hours at an elevated temperature. The treated samples are then examined and tested and the results compared with similar results obtained by testing the unaged vulcanized stock. The deterioration in properties suffered as a result of the oxidation treatment is indicative of the result that would normally be expected from that particular stock during several years of natural aging. Such a test is known as the Bierer-Davis aging test.

The new class of anti-oxidant or age resisting materials which have been found upon incorporation into a rubber stock to impart such excellent age resisting qualities to the vulcanized product that portions thereof, when subjected to the artificial aging tests described, undergo only a relatively small loss in tensile strength and other qualities, comprise a reaction product of a trihydric alcohol, such for example as glycerine and the like, and an aromatic amine. More particularly the present invention relates to the use of a class of anti-oxidants having the formula of

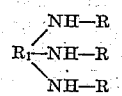

wherein $R_1$ represents a glyceryl radical and R reprsents an aromatic radical.

One method whereby one of the preferred class of anti-oxidants, for example the reaction product of glycerine and beta naphthylamine, may be prepared is as follows.

Glycerine and beta naphthylamine in the ratio of substantially one molecular proportion of the first compound to substantially three molecular proportions of the latter compound were placed in a suitable vessel equipped with a condenser, thermometer and means for agitation, and heated for substantially from three to five hours at a temperature of approximately 170 to 200° C., in the presence of a small proportion of a catalyst or condensing agent such for example as iodine, anhydrous zinc chloride and the like. It is preferable that the reacting components be agitated during the reaction. On completion of the reaction, the product so obtained was washed preferably first with a dilute acid, for example a 10% hydrochloric acid solution, then with water and dried. It is thought the reaction representing the preparation of the above compound proceeds as follows:

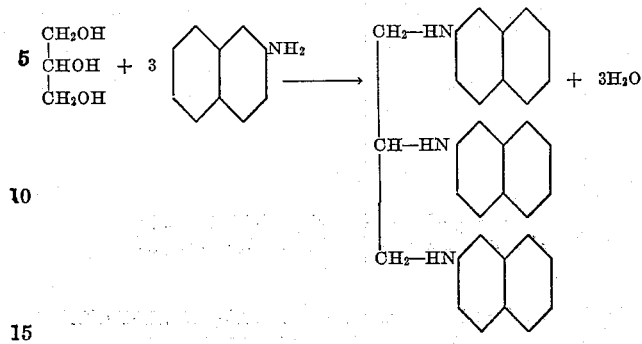

The material prepared as described may be called tri beta naphthylamino propane. The product prepared in the manner described, comprising a resin melting at substantially 97.4 to 100° C., was compounded in the well known manner in a rubber stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

The stock was then vulcanized by heating sheets of said stock in a press in the well known manner for different periods of time at the temperature given by forty pounds of steam pressure to the square inch (that is 287° F.). Portions of the stock cured as set forth were then artificially aged by heating portions of said stock in an oxygen bomb in the manner described for 39 hours at a temperature of 70° C. and an oxygen pressure of 300 pounds per square inch. A comparison between the tensile and modulus properties of the aged and unaged vulcanized rubber product is given in Table I.

Table I

| Cure minutes | Hours aged | Modulus of elasticity in lbs/in² at elongations of | | Tensile at break in lbs/in² | Ultimate elongation, per cent |
|---|---|---|---|---|---|
| | | 300% | 500% | | |
| 30 | 0 | 841 | 2280 | 3555 | 670 |
| 30 | 39 | 890 | 2160 | 2725 | 580 |
| 60 | 0 | 1295 | 3210 | 4460 | 640 |
| 60 | 39 | 1405 | 2905 | 3355 | 560 |

The data set forth in Table I shows that the preferred class of anti-oxidant materials, for example the reaction product of glycerine and beta naphthylamine possess particularly desirable anti-oxidant properties.

The preferred class of anti-oxidants has also been employed in a so-called pure gum stock. Thus, for example the reaction product of substantially one molecular proportion of glycerine and substantially three molecular proportions of beta naphthylamine was compounded in the usual manner in a rubber stock comprising

| | Parts |
|---|---|
| Pale crepe rubber | 100 |
| Zinc oxide | 5 |
| Stearic acid | 1 |
| Sulfur | 2.5 |
| The reaction product of 2,4 dinitro chlor benzene and mercaptobenzo thiazole activated with diphenyl guanidine | 1 |
| Anti-oxidant | 1 |

The compounded rubber stock was then cured by heating in a press for different periods of time at the temperature of 20 pounds of steam pressure per square inch. Portions of the cured rubber product were then artificially aged by heating in a bomb in the manner described for 48 hours at 70° C. and under an oxygen pressure of 300 pounds per square inch. A comparison between the aged and unaged stocks showed that the product described exerted desirable anti-oxidant properties in a so-called pure gum stock.

Another example of the preferred class of anti-oxidants was prepared by reacting substantially one molecular proportion of glycerine with a slight excess over substantially three molecular proportions of alpha naphthylamine in a manner analogous to that described above. It is thought that reaction representing the preparation of the compound described proceeds according to the following equation:

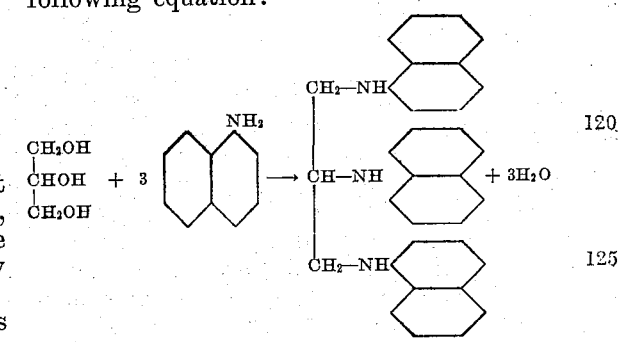

The material prepared as described may be called trialpha naphthylamino propane. The product thus prepared comprising a resin was incorporated in a rubber mix in the usual manner comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

The compounded rubber stock was then cured by heating in a press for different periods of time at the temperature exhibited by 40 pounds of steam pressure per square inch. The cured rubber product was then aged in the manner set forth for 39 hours at a temperature of 70° C. under an oxygen pressure of 300 pounds per square inch. The tensile data of the aged and unaged vulcanized rubber product follows in Table II.

*Table II*

| Cure minutes | Hours aged | Modulus of elasticity in lbs/in² at elongations of | | Tensile at break in lbs/in² | Ultimate elongation per cent |
|---|---|---|---|---|---|
| | | 300% | 500% | | |
| 30 | 0 | 799 | 1903 | 2505 | 595 |
| 30 | 39 | 660 | | 1090 | 440 |
| 60 | 0 | 1325 | 3055 | 4145 | 615 |
| 60 | 39 | 1060 | | 1560 | 430 |
| 90 | 0 | 1600 | 3475 | 4205 | 580 |
| 90 | 39 | 1245 | | 1520 | 380 |

From the data set forth in Table II it is apparent that the reaction product of glycerine and alpha naphthylamine possesses the desirable anti-oxidant properties of the preferred class of compounds.

As further examples of operating the present invention, substantially one molecular proportion of a trihydric alcohol, for example glycerine, has been reacted with substantially three molecular proportions of each of the following amines: aniline, 2,4 diamino diphenyl amine, ortho toluidine, para toluidine and para phenetidine and the reaction products obtained compounded in a rubber tread stock comprising

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

The compounded rubber stocks were cured and portions of the cured rubber product were artificially aged in the manner previously described. It was found that the cured rubber product, wherein the anti-oxidants described above were employed, showed increased age resisting properties over a similar stock wherein an accelerator, for example, diphenyl guanidine was employed without an anti-oxidant.

From the data hereinbefore set forth it is apparent that the preferred class of compounds comprise an important class of anti-oxidants which have been employed advantageously in a rubber stock in conjunction with different types of accelerators and in both pure gum and tread stocks.

The present invention is limited solely by the claims attached hereto as a part of the present specification wherein it is intended to claim the invention as broadly as possible in view of the prior art.

What is claimed is:

1. The process of vulcanizing rubber which comprises heating rubber and sulfur in the presence of an anti-oxidant comprising a reaction product of a glycerol and an aromatic amine.

2. The process of vulcanizing rubber which comprises heating rubber and sulfur in the presence of an anti-oxidant comprising a reaction product of a glycerol compound and an aromatic amine.

3. The process of vulcanizing rubber which comprises heating rubber and sulfur in the presence of an anti-oxidant comprising a reaction product of a glycerol and a naphthyl amine.

4. The process of vulcanizing rubber which comprises heating rubber and sulfur in the presence of an anti-oxidant comprising a reaction product of a glycerol and beta naphthyl amine.

5. The process of vulcanizing rubber which comprises heating rubber and sulfur in the presence of an anti-oxidant comprising a reaction product of substantially one molecular proportion of glycerine and substantially three molecular proportions of beta naphthyl amine.

6. The process of vulcanizing rubber which comprises heating rubber and sulfur in the presence of an anti-oxidant having the formula

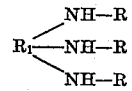

wherein $R_1$ represents a glyceryl radical and R represents an aromatic radical.

7. The process of vulcanizing rubber which comprises heating rubber and sulfur in the presence of tribeta naphthylamino propane.

8. The vulcanized rubber product prepared by heating rubber and sulfur in the presence of an anti-oxidant comprising a reaction product of a glycerol and an aromatic amine.

9. The vulcanized rubber product prepared by heating rubber and sulfur in the presence of an anti-oxidant comprising a reaction product of a glycerol compound and an aromatic amine.

10. The vulcanized rubber product prepared by heating rubber and sulfur in the presence of an anti-oxidant comprising a reaction product of a glycerol and a naphthyl amine.

11. The vulcanized rubber product prepared by heating rubber and sulfur in the presence of an anti-oxidant comprising a reaction product of a glycerol and beta naphthyl amine.

12. The vulcanized rubber product prepared by heating rubber and sulfur in the presence of an anti-oxidant comprising a reaction product of substantially one molecular proportion of glycerine and substantially three molecular proportions of beta naphthyl amine.

13. The vulcanized rubber product prepared by heating rubber and sulfur in the presence of an anti-oxidant having the formula

wherein $R_1$ represents a glyceryl radical and R represents an aromatic radical.

14. The vulcanized rubber product prepared by heating rubber and sulfur in the presence of tribeta naphthylamino propane.

In testimony whereof I hereunto affix my signature.

JOSEPH R. INGRAM.